United States Patent [19]

Borner

[11] Patent Number: 4,632,258
[45] Date of Patent: Dec. 30, 1986

[54] RECEPTACLE HOLDER OR STAND FOR A KITCHEN UTENSIL

[76] Inventor: Jurgen Borner, 5561 Landscheld-Niederkail, Fed. Rep. of Germany

[21] Appl. No.: 639,905

[22] Filed: Aug. 13, 1984

[30] Foreign Application Priority Data

Aug. 17, 1983 [DE] Fed. Rep. of Germany ... 8323644[U]

[51] Int. Cl.$^4$ ............................................. A47F 5/08
[52] U.S. Cl. ..................................... 211/70.6; 211/89; 248/37.6
[58] Field of Search ........................ 211/70.6, 70.7, 89, 211/13; 206/553; 248/37.3, 37.6

[56] References Cited

U.S. PATENT DOCUMENTS 2,935,287  5/1960  Higgins .
3,977,523  8/1976  Cousino ............................ 211/89 X
4,043,453  8/1977  Greenlee ......................... 211/70.6 X Primary Examiner—Robert W. Gibson, Jr.
Attorney, Agent, or Firm—Shapiro and Shapiro

[57] ABSTRACT

A receptacle for a kitchen utensil (1), with an upwardly open frame (6) for the kitchen utensil (1). The receptacle is intended to ensure a reliable safekeeping of the kitchen utensil (1) provided with knives (3). This is achieved by providing a movable detent (10) on a wall of the frame (6), which detent projects transversely to the insert direction into the insert frame (6). After insertion of the kitchen utensil (1) into the frame (6) the detent (10) engages behind a catch means located on the kitchen utensil (1).

12 Claims, 5 Drawing Figures

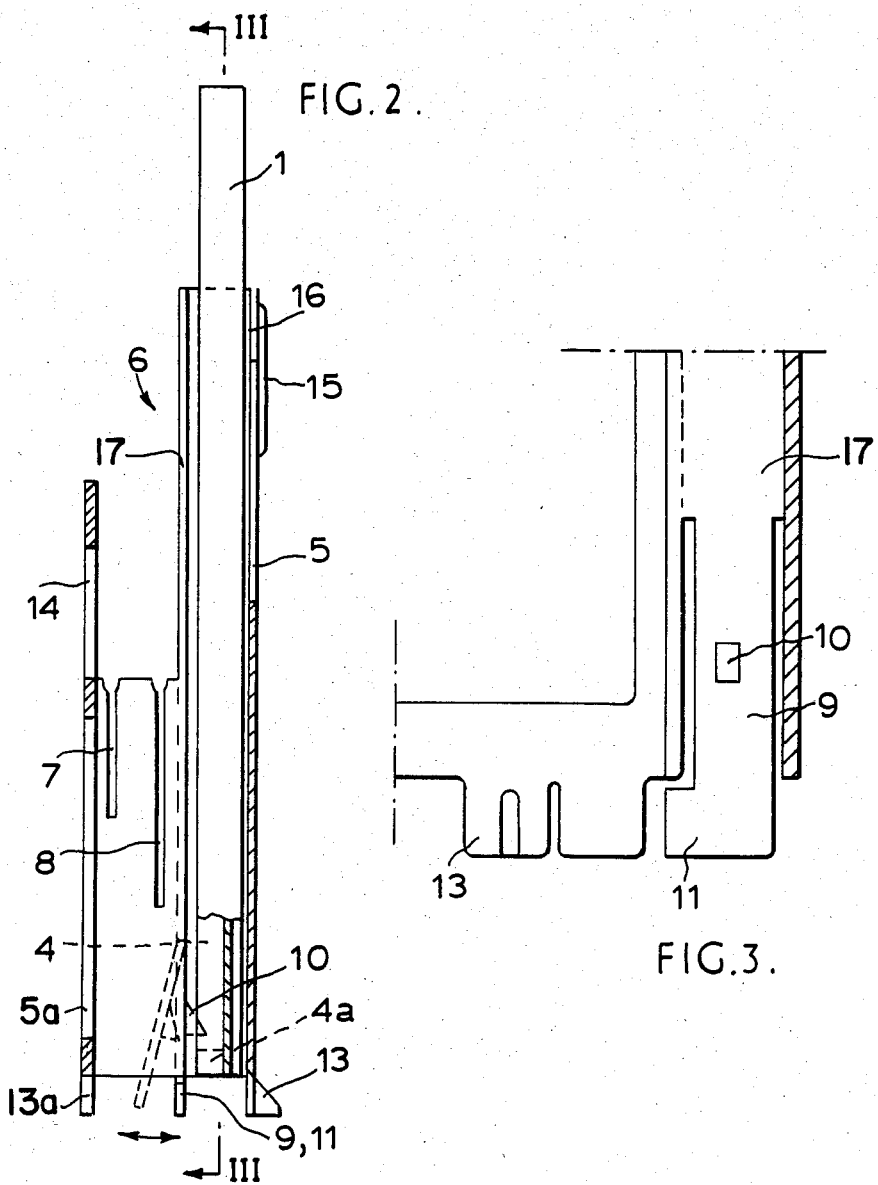

RECEPTACLE HOLDER OR STAND FOR A KITCHEN UTENSIL

The invention relates to a receptacle, holder, or stand, hereinafter referred to as a receptacle, for a kitchen utensil.

The kitchen utensil is generally of the kind comprising a vegetable or fruit cutter which has a flat frame with a V-shaped knife. Exchangeable cutting inserts can be inserted from one end of the frame and are selected according to the nature of the material and manner in which it is to be cut. The material to be cut can be moved backwards and forwards in the longitudinal direction of the cutter by means of a fruit or vegetable holder, in order to be cut into strips or slices.

A prior receptacle for a kitchen utensil of the kind referred to is shown in DE-GM 81 01 023. This receptacle receives the frame with the V-shaped knife of the kitchen utensil as well as the various insert frames and optionally also the holder for the material to be cut, so that these parts can be put away and stored in a neat tidy manner in the smallest possible space, ready for use.

Kitchen utensils, in particular of the above-described type with incorporated knives, are not without danger for the user and can cause injury, especially if incorrectly used. This is particularly so if the utensils fall into the hands of children or are otherwise accessible to them.

It is accordingly an object of the invention to provide a receptacle for the simple and reliable safekeeping of kitchen utensils of the type mentioned above.

Accordingly there is provided a receptacle for a kitchen utensil with a substantially rectangular base element having an open frame for receiving the kitchen utensil, comprising:
 (i) a frame open in the direction of insertion for receiving a utensil;
 (ii) said frame being defined by a wall;
 (iii) at least one detent carried by said wall;
 (iv) said detent being movable transversely with respect to the insert direction, whereby after insertion of the kitchen utensil into the frame the detent engages behind the utensil on catch means thereof.

Thus with the invention the kitchen utensil can no longer be directly removed after having been inserted into the receptacle, thereby providing a safeguard preventing children and others from simply removing the kitchen utensil from the receptacle.

In order to simplify handling it is convenient to mount the detent on at least one flexible tongue arranged in a wall of the frame. The tongue is then forced back on inserting the kitchen utensil, until the catch means has overcome the detent and is engaged from behind by the latter. In order to remove the kitchen utensil the detent is disengaged by pressing against the flexible tongue.

One particularly preferred embodiment of the receptacle according to the invention, is hereinafter described by way of example, with reference to the accompanying drawings, in which:

FIG. 2 shows the receptacle and utensil of FIG. 1 in longitudinal section along the line II—II of FIG. 1, wherein the kitchen utensil is only partly in section and has also been shown greatly simplified;

FIG. 3 is the detail A of FIG. 1, shown enlarged, namely the rear part of the frame in which the flexible tongue is formed, and without the kitchen utensil, viewed in section along the line III—III of FIG. 2;

Figure 1:
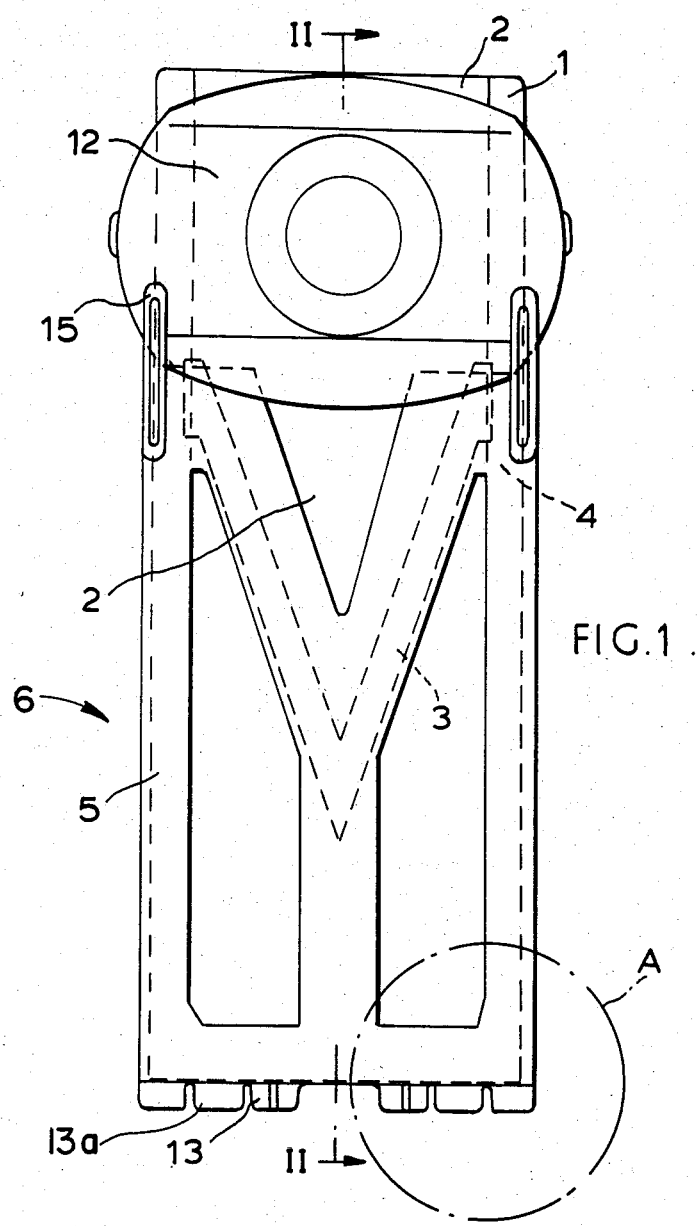
FIG. 1 is a schematic front view of a receptacle in which is received a kitchen utensil which is a vegetable and fruit cutter.

Referring to the drawings, as shown schematically in FIG. 1, a conventional vegetable and fruit cutter (shown received within a receptacle to be described) consists of a rectangular flat or plate-shaped frame 1 with a V-shaped cutting knife 3, (which may be formed of two inclined blade parts) wherein various inserts 2 that are selected depending on the nature of the material and the manner in which it is to be cut can be inserted from one side towards the cutting knives 3.

The frame 1 of the vegetable and fruit cutter is laterally bounded by grooves 4 of roughly U-shaped cross-section, which are closed at the ends by studs 4a (see FIG. 2). The function and action of one of these studs 4a will be subsequently described.

Figure 4:
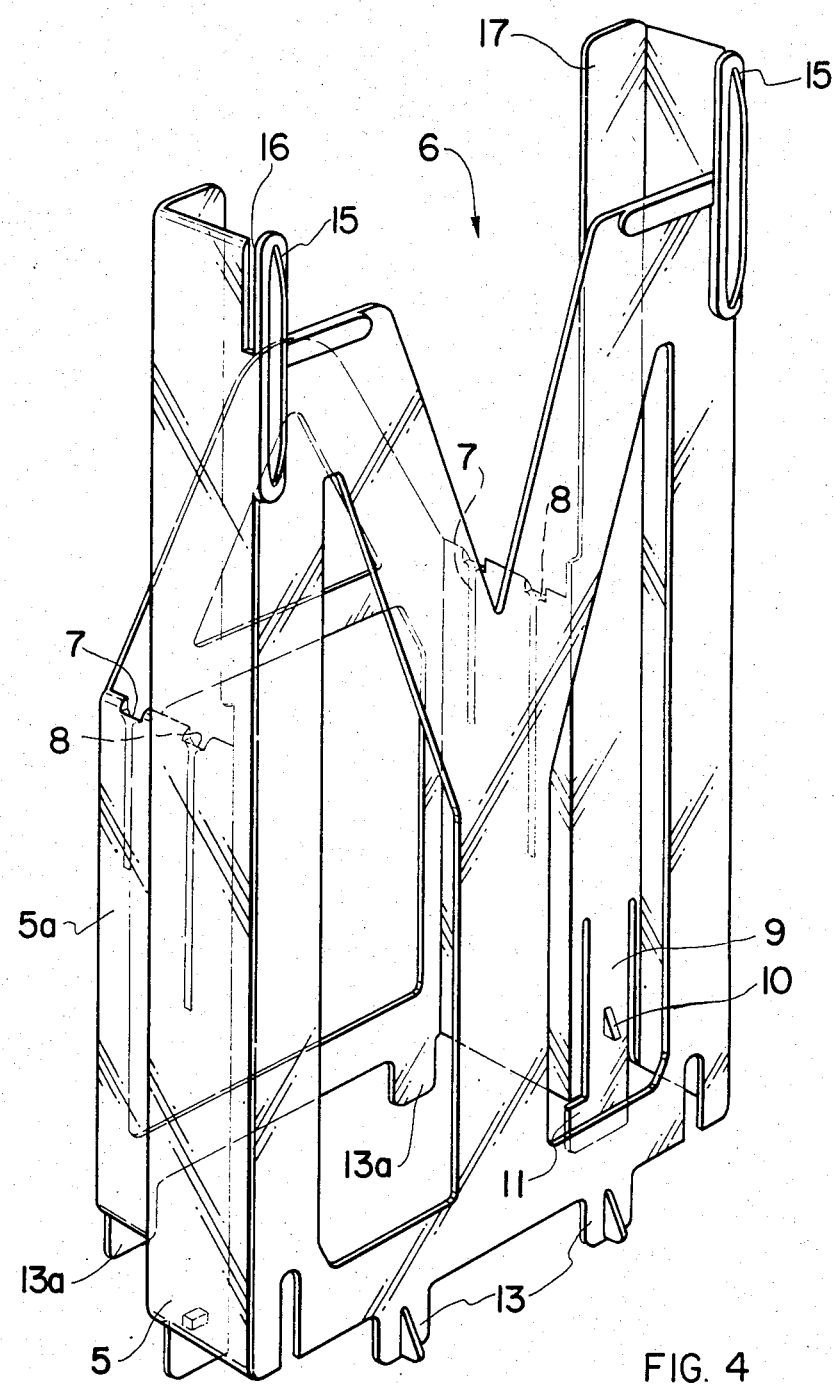
FIG. 4 is a perspective view showing the receptacle generally from the front.
Figure 5:
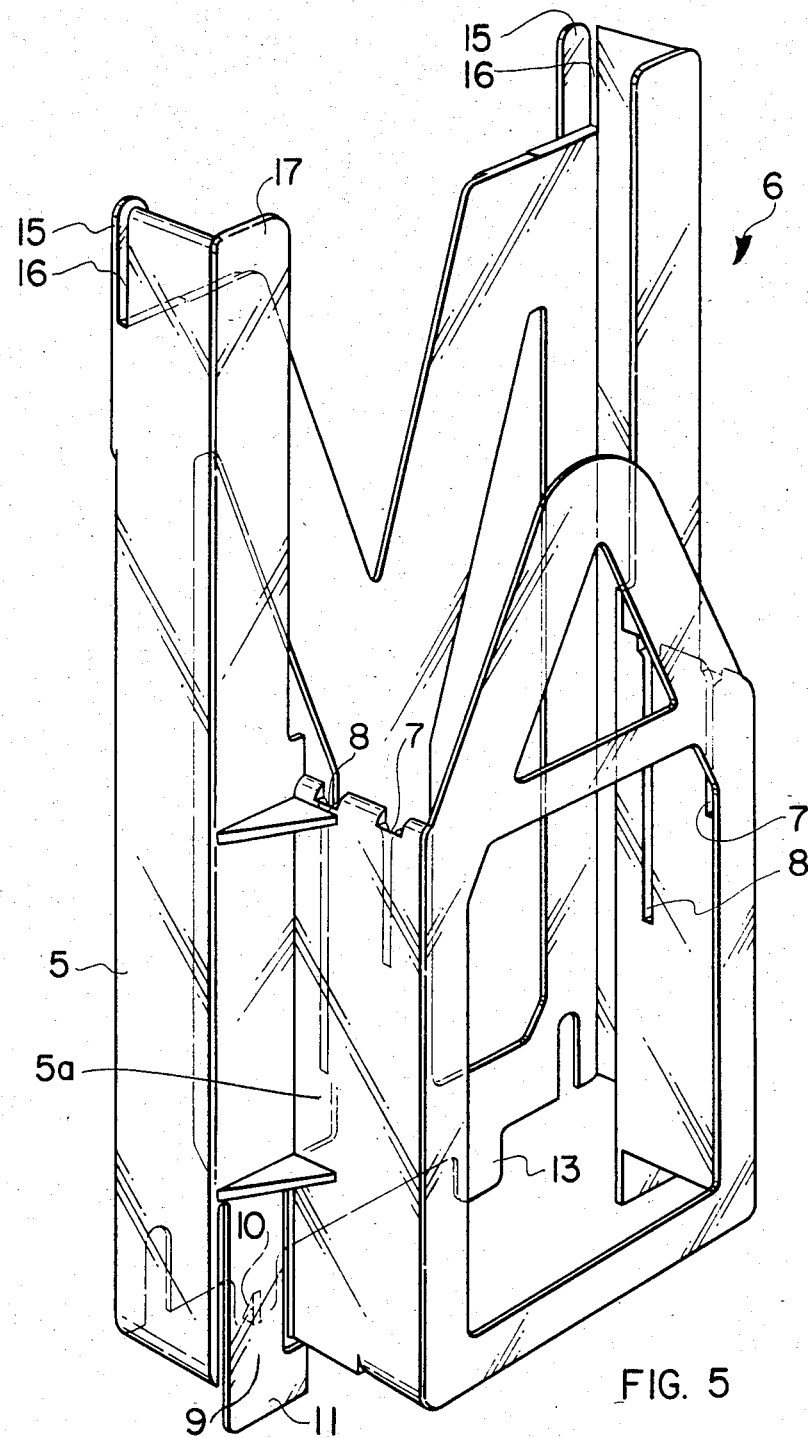
FIG. 5 is a perspective view showing the receptacle generally from the rear.

As can be seen in particular from FIGS. 2, 4 and 5, a receptacle for the kitchen utensil in accordance with the invention comprises an essentially rectangular base element 5 which is provided with a similarly essentially rectangular attachment 5a which together with the base element 5 forms an upwardly open frame 6 of U-shaped cross-section for the kitchen utensil and cutting inserts. The frame 6 and kitchen utensil may consist of any suitable materials, but are preferably of plastics.

Grooves 7 and 8 are formed parallel to the frame 6 in the internal surface of two narrow sides of attachment 5a adjoining base element 5, and serve to guidingly receive two inserts 2 that can be inserted alternatively in the kitchen utensil. The grooves 7 and 8 are of different depths so that inserts 2 of the same size can be staggered, i.e. can be arranged in an easily accessible manner in the holder.

A flexible tongue 9 is formed in a side wall of the frame 6, and a detent 10 is integral with the tongue 9 and in the rest position projects into the frame 6 as shown in full lines in FIG. 2. The flexible tongue 9 can be bent back manually toward the rear of the frame (to the left as viewed in FIG. 2) by the user engaging its free (lower in use) end formed as a gripping part 11, so that the detent 10 is retracted from the base element 5. The double arrow in FIG. 2 illustrates the possible movement, the release position of the detent being indicated by the dotted line. In the preferred embodiment the flexible tongue 9 is formed with a free end in the lower end portion, as considered in the utensil insert direction, of a wall of the frame 6 (see also FIG. 3) and projects together with the gripping part 11 beyond the frame 6.

More particularly, the embodiment shown, the tongue 9 is formed in the end section of a wall 17 of a broad side of the base element 5 of the frame 6 for the kitchen utensil and is provided with a detent 10 of triangular shape in longitudinal section, which projects into the frame 6 in a direction transversely of the insert direction (see FIGS. 2 and 4).

There may be a tongue 9 provided on both sides of the receptacle, or only on one side as shown.

The receptacle serves to accommodate a kitchen utensil in the frame 6 as well as further inserts 2 in the grooves 7 and 8, as well as optionally a holder 12 for the food material to be cut in a manner to be described later.

The manner in which kitchen utensil 1 is stored within the illustrative receptacle will now be described with reference to FIG. 2. The kitchen utensil is inserted into the frame 6 until the engagement element formed on the kitchen utensil, in this case a stud 4a, passes beyond the detent 10 formed on the flexible tongue 9. The flexible tongue 9 flexes away (to the left in FIG. 2) when the stud 4a engages the detent 10, to slide thereover. When it has cleared the detent the flexible tongue springs back under its own resilience to the initial position so that the detent overlies the stud 4a. The kitchen utensil can then no longer be moved contrary to the insert direction. On the other hand, a stop means (not illustrated) limits the insertion depth of the kitchen utensil.

When the detent 10 is over the catch means, which is the stud 4a, the kitchen utensil together with the cutting knife 3 cannot be directly removed from the receptacle. To remove the utensil it is necessary to bend back the flexible tongue 9, in particular by engaging the gripping part 11, so that the detent 10 is retracted from the frame 6, out of the path of the kitchen utensil in the frame 6. The utensil can then be removed from the receptacle, whereupon the flexible tongue 9 is again released so that the detent 10, once more projects in the now empty frame 6.

The base element 5 and attachment 5a of the receptacle are provided with respective feet 13, 13a at their lower ends as regards the insert direction of the kitchen utensil, so that the receptacle can stand upright on a work surface, draining board or table. The rear of attachment 5a also has an eye 14 for mounting the receptacle on a wall.

Finally, the base element 5 has two ribs 15 on its front (in use) side which together with side walls of the base element 5 of the frame 6 form upwardly open slots 16 for receiving the holder 12 (see FIGS. 1 and 2).

The receptacle thus provides a reliable and safe way to store a kitchen utensil which incorporates a knife blade or blades.

I claim:

1. A receptacle for a kitchen utensil of the type which is of flat rectangular form carrying a cutting knife and which is constructed to accommodate a cutting insert, for cutting food articles such as fruits and vegetables into strips, said receptacle comprising a frame which includes a base portion of rectangular cross section open at an upper end thereof and constructed to receive said utensil strictly by longitudinal insertion of said utensil vertically downward through said upper end and to permit withdrawal of said utensil vertically upward through said upper end, said base portion having sidewalls configured to conform laterally to said utensil to hole said utensil upright, at least of one of said sidewalls carrying a manually displaceable tongue portion with a detent directed inwardly of said base portion, said tongue portion being movable transversely to the insertion direction of said utensil, with said detent being located intermediate the longitudinal ends of said one sidewall in a position such that on insertion of said utensil a leading longitudinal end of said utensil inserts past said detent, said detent further being disposed to engage said utensil behind said leading end along an intermediate lengthwise portion of said utensil to prevent withdrawal of said utensil from said receptacle.

2. A receptacle as defined in claim 1, further including a substantially rectangular attachment joined to a broad side of said base element, said attachment having an open upper end and being constructed to receive plate-shaped cutting inserts for said utensil by insertion of said inserts vertically downward through the upper end of the attachment and to permit withdrawal of said inserts upwardly therefrom, said attachment including guide means for guidingly receiving said inserts.

3. A receptacle as defined in claim 1, wherein said tongue portion is formed with a free end in a lower end of said one sidewall and wherein said free end projects beyond the frame.

4. A receptacle as defined in claim 1, wherein said one wall is positioned along a broad side of said base element.

5. A receptacle as defined in claim 1, wherein a free end of said tongue portion is widened to provide a grip for manual displacement of said tongue portion.

6. A receptacle as defined in claim 1, wherein the detent is triangular in vertical section.

7. A receptacle as defined in claim 2, wherein said guide means includes grooves in the inside faces of two narrow sidewalls of the attachment.

8. A receptacle as defined in claim 7, wherein the grooves are of various lengths corresponding to respective inserts.

9. A receptacle as defined in claim 7, wherein the grooves are formed vertically parallel to one another.

10. A receptacle as defined in claim 1, wherein said base element and said attachment are provided with feet at respective bottom ends thereof.

11. A receptacle as defined in claim 10, wherein said attachment is provided with a mounting device for mounting said frame upright on a wall.

12. A receptacle as defined in claim 1, wherein said base element has ribs which together with upper portions of opposite side walls of the base element form upwardly open slots to receive a holder for food to be cut.

* * * * *